United States Patent [19]

Chasteen

[11] 4,405,379
[45] Sep. 20, 1983

[54] METHOD FOR CLEANING METAL PARTS

[75] Inventor: Jack W. Chasteen, Kettering, Ohio

[73] Assignee: University of Dayton, Dayton, Ohio

[21] Appl. No.: 314,594

[22] Filed: Oct. 26, 1981

Related U.S. Application Data

[63] Continuation-in-part of Ser. No. 119,060, Feb. 6, 1980, Pat. No. 4,324,594, and Ser. No. 119,061, Feb. 6, 1980, Pat. No. 4,328,044, each is a continuation-in-part of Ser. No. 874,915, Feb. 2, 1978, Pat. No. 4,188,237.

[51] Int. Cl.$^3$ .......................... B08B 5/00; C23G 5/00
[52] U.S. Cl. ........................................ 134/2; 134/19; 134/31; 228/206
[58] Field of Search ................ 134/2, 19, 31; 228/206

[56] References Cited

U.S. PATENT DOCUMENTS

| | | | |
|---|---|---|---|
| 2,571,328 | 10/1951 | Baker | 134/2 X |
| 2,585,819 | 2/1952 | Moore et al. | 228/206 |
| 2,851,387 | 9/1958 | Low | 148/16 X |
| 4,098,450 | 7/1978 | Keller et al. | 228/119 |

FOREIGN PATENT DOCUMENTS 1454217 11/1976 United Kingdom .

OTHER PUBLICATIONS

"Brazing Stainless Steel in a stable reducing atmosphere of Fluoride", AWS Conference (Philadelphia, Pa.–Apr. 1977).

Watson et al., *Bureau of Mines Report 4756*, "Decomposition Temperatures of . . . As Indicated by Halogen Liberation", Dec. 1950.

*Primary Examiner*—Marc L. Caroff
*Attorney, Agent, or Firm*—Biebel, French & Nauman

[57] ABSTRACT

A method for cleaning metal parts, particularly crack damaged gamma prime hardened nickel alloy parts, but also including stainless steels superalloys, and solid solution superalloys in order to render them brazable or otherwise bondable. The method makes use of a C-O-H-F atmosphere as the primary cleaning material wherein the atmosphere has an H/O ratio of $10^4$ or greater, and a C/F ratio of approximately 0.01 to less than 2.0. The preferred source of the C-O-H-F atmosphere is thermal decomposition of a fluorocarbon resin and a low moisture containing hydrogen gas although sources other than fluorocarbon resins are also disclosed.

16 Claims, 5 Drawing Figures

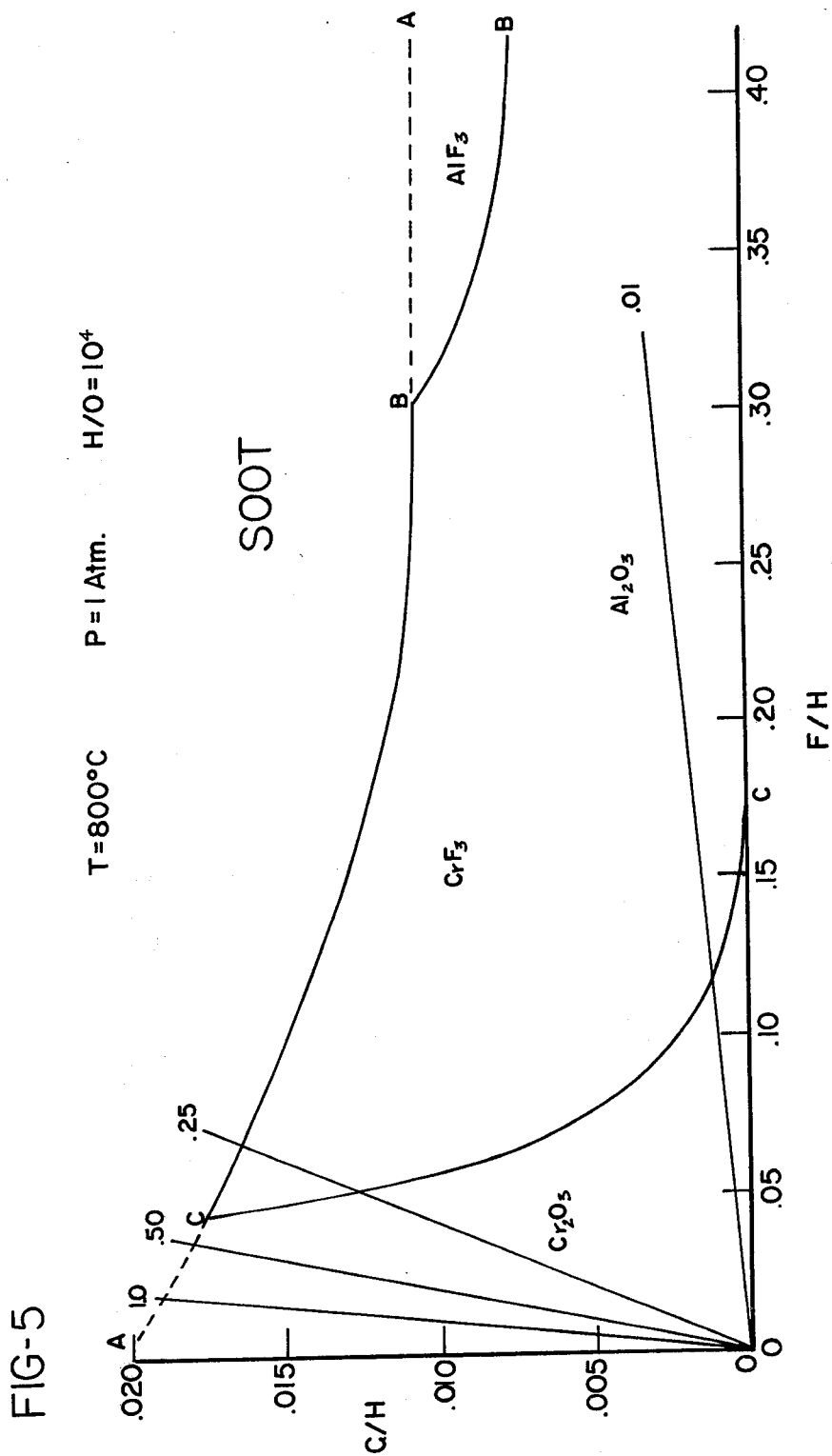

METHOD FOR CLEANING METAL PARTS

CROSS REFERENCE TO RELATED APPLICATIONS

This application is a combined continuation-in-part of applications Ser. No. 119,060 now U.S. Pat. No. 4,324,594 and Ser. No. 119,061 now U.S. Pat. No. 4,328,044, both filed Feb. 6, 1980, which in turn are continuation-in-part applications of Ser. No. 874,915 filed Feb. 2, 1978, now U.S. Pat. No. 4,188,237.

BACKGROUND OF THE INVENTION

The present invention relates to a method for cleaning unbrazable metal parts and, more particularly, to a process for cleaning metal parts with an atmosphere containing the elements C-O-H-F so that the parts can thereafter be brazed or otherwise bonded.

Late model gas turbine engines for example, those on the Boeing 747, the DC-10, and the Lockheed L-1011, employ in their turbine sections nickel based alloys that are gamma prime hardened. Many other engines contain such materials, and the use of gamma prime hardened alloys will no doubt increase in the future due to the desirable properties of these superalloys. Engine parts made of such alloys are very expensive and, at present, are not repairable when crack damaged due to metal fatigue. Attempts to weld repair such components results in post-weld cracking. Likewise, conventional brazing cannot be effected because nickel-base braze alloys will not run on the gamma prime hardened surfaces. Thus, although a molten brazing alloy under high vacuum might stick new gamma prime hardened parts together, it has not previously been possible to place brazing alloy inside cracks in damaged gamma prime hardened alloy parts. The control of the parameters of that process to enable low temperature cleaning of these parts is not however, disclosed in U.S. Pat. No. 4,188,237.

A successful braze is manifest when braze material is placed at the source of a crack (say 0.001 inch wide and one-half inch long) and, at brazing temperature, not only melts and sticks to the parent material, but also runs into and fills the length of the crack. Apparently, in use a gamma prime hardened alloy becomes oxidized and/or sulfidized to the extent that the aluminum, titanium and chromium oxides or sulfides, which coat the surface of the part, including the surfaces of the crack, prevent successful repair by brazing.

Accordingly, it has been recognized that such parts must be cleaned if they are to be brazed. Keller et al, in U.S. Pat. No. 4,098,450 suggests the use of chromium fluoride ($CrF_3$) and hydrogen ($H_2$) to clean damaged parts of gamma prime hardened alloys prior to a braze repair. From that process description, it is speculated that the following reactions comprise the suggested mechanism:

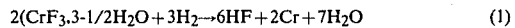

$$2(CrF_3 \cdot 1/2 H_2O) + 3H_2 \rightarrow 6HF + 2Cr + 7H_2O \quad (1)$$

$$MO_x + 2xHF \rightarrow MF_{2x} + xH_2O \quad (2)$$

If then, $MF_{2x}$ is volatile at the reaction temperature, the oxide is effectively reduced and the base metal (M) should be brazable. It is readily shown, however, that reaction (1) is incapable of producing an HF concentration in the gas in excess of that which is in equilibrium with chromium and its fluoride. Such concentrations are incapable of causing reaction (2) to proceed as shown when the metal oxide is more noble than $Cr_2O_3$. In particular, if the metal is aluminum, the reaction will not proceed and cracks in gamma prime hardened alloys will not be cleaned. Because of this and inadequate control over the H/O ratio, uniform reproducibility of results are lacking and many parts cleaned by this process are still not brazable.

A much more effective process is that disclosed and claimed in U.S. Pat. No. 4,188,237. However, that patent is for the most part directed to cleaning crack-damaged gamma prime hardened alloys. It has been established that a similar process is also effective in cleaning other metals, especially stainless steels, superalloys, and solid solution superalloys, as well as the gamma prime hardened nickel alloys.

Fabrication of stainless steel composites by nickel brazing has long been of commercial interest. Before such devices can be fabricated by brazing, however, it is necessary to clean the faying surfaces of all metal oxides (or other compounds). The problem arises because the surfaces of such alloys are covered with a passive film which will not be wetted by a brazing alloy. The most stable oxide in such a film in these alloys is that of chromium and any pre-braze cleaning technique necessarily centers on this compound. It is necessary to reduce the chromium oxide (and all other oxides) to its metallic element before brazing can be accomplished.

A technique that is commonly employed to prepare such alloys for brazing is that of exposing them to a dry hydrogen atmosphere at high temperatures (>1000° C.). Hydrogen cleaning is highly functional but has the disadvantage that the cleaning only takes place at temperatures that are near to or higher than the brazing temperature. It is also known that stainless steel can be brazed in a stable reducing atmosphere of fluoride. In a paper presented by the Toulouse, France, Microturbo Company representatives at the American Welding Society (AWS) meeting in Philadelphia in April 1977, later published in the Welding Journal, November, 1977, and entitled "Brazing Stainless Steel in a Stable Reducing Atmosphere of Fluoride," there is described a brazing process carried out in a halogen atmosphere obtained by the decomposition of fluorine salts such as ammonium bifluoride acid and chromium fluoride. The proposed reactions are:

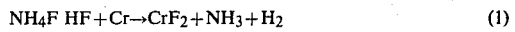

$$NH_4F \cdot HF + Cr \rightarrow CrF_2 + NH_3 + H_2 \quad (1)$$

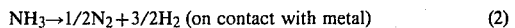

$$NH_3 \rightarrow 1/2 N_2 + 3/2 H_2 \text{ (on contact with metal)} \quad (2)$$

$$CrF_2 + H_2 \rightarrow 2HF + Cr \quad (3)$$

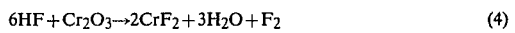

$$6HF + Cr_2O_3 \rightarrow 2CrF_2 + 3H_2O + F_2 \quad (4)$$

There are two pertinent observations regarding these reactions: (a) the object would appear to be the production of HF gas which, in turn, does the cleaning, and (b) any elemental fluorine that forms is produced downstream of the work piece (see reaction 4). It is noted that in the presented paper there is an indication that "the technique cannot be used on assemblies of materials having a high level of electropositivity, such as titanium and zirconium", and "it is essential to avoid the introduction of carbon into the furnace during brazing".

Similarly, Moore in U.S. Pat. No. 2,585,819 discloses a process of fluxing metal parts with a stable, non-oxidizing atmosphere containing HF gas. The metal parts are ones such as steels which are to be brazed or soldered.

Finally, Low, U.S. Pat. No. 2,851,387 relates to a process for nitriding high chromium stainless steels. In Low's discussion of the prior art he notes that all prior processes of depassifying such steels require immediate nitriding or the internal effects of the depassifying were lost. A specific purpose of his invention is a combined reactivating and nitriding operation which avoids any problems of interruption in the sequence of steps. The combined operations are provided by a mixture of decomposed fluorocarbon resin gases and ammonia gas. The result is a nitrided product; a cleaned brazable product is not produced.

SUMMARY OF THE INVENTION

The present invention provides a simple, inexpensive method for cleaning damaged gamma prime alloy parts, stainless steels, superalloys by subjecting the part to an atmosphere containing carbon, oxygen, hydrogen and fluorine (C-O-H-F) gaseous elements. The invention atmosphere possesses a critical H/O and C/F ratio and can be derived from various carbon and fluorine sources, although thermal decomposition of polytetrafluoroethylene (PTFE) remains the preferred source.

In accordance with the invention, cleaning is accomplished by subjecting the part to a C-O-H-F atmosphere having an H/O ratio of $10^4$ or greater, and a C/F ratio of approximately 0.01 to less than 2.0. When using such a gaseous atmosphere under conditions described below, it is possible to adequately clean metal parts at temperatures as low as 750° C. This is to be compared with a commonly employed practice of preparing metal parts for brazing by exposing them to a dry hydrogen atmosphere at temperatures well in excess of 1000° C. The energy savings obtained from relatively low temperature cleaning are apparent.

The invention provides a method for cleaning unbrazable metal parts to render them brazable or otherwise bondable, comprising:

(a) placing said part in a hermetically sealed chamber,
(b) subjecting said part to a gaseous atmosphere in said chamber, said atmosphere containing the elements C-O-H-F and having an H/O ratio of $10^4$ or greater and a C/F ratio of approximately 0.01 to 1.0;
(c) raising the temperature of said chamber to a temperature less than 1000° C.;
(d) allowing said part to remain in said heated chamber filled with said atmosphere for a period of time sufficient to clean said part and render it brazable or otherwise bondable, and
(e) cooling said chamber and said part prior to removing it from said chamber.

BRIEF DESCRIPTION OF THE DRAWINGS

FIG. 5 is a phase stability diagram for the FIG. 3 system where $H/O = 10^4$ and $T = 800°$ C.

DETAILED DESCRIPTION OF THE INVENTION

Figure 1:
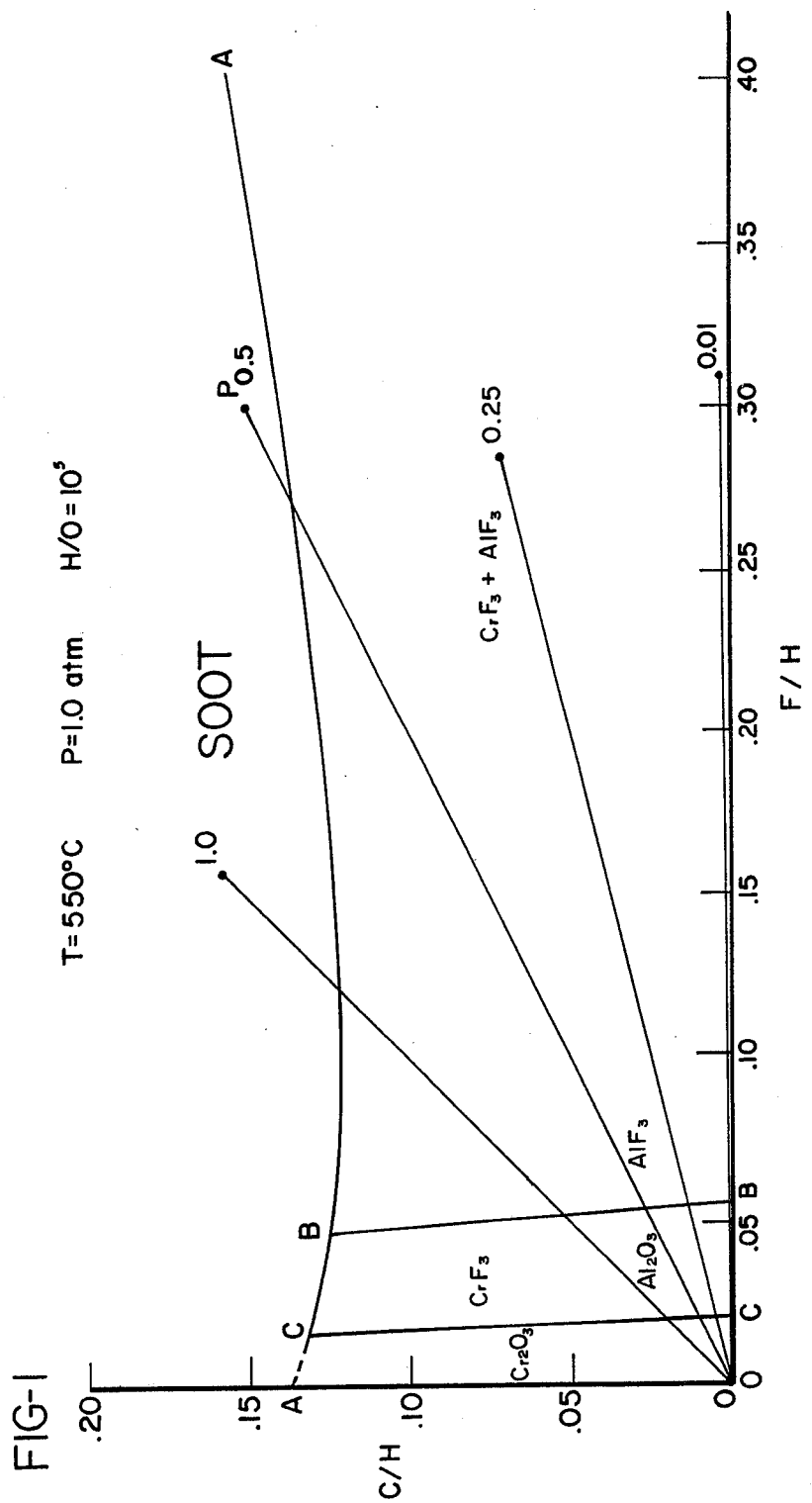
FIG. 1 is a phase stability diagram for a Cr-Al-C-O-H-F system at 1.0 atm. pressure, $H/O = 10^5$ and $T = 550°$ C.

The H/O, C/F, F/H and C/H ratios referred to herein are atomic ratios.

The term "otherwise bondable" as used herein refers to the formation of a metal-to-metal bond such as occurs in metallurgical processes such as diffusion welding and hot isotatic bonding.

The principal application for the invention process is in preparing metal parts for brazing or diffusion welding as part of a repair process. The invention, however, also finds application as an initial cleaning step prior to new parts manufacture or assembly.

Among the alloys cleanable are stainless steels, superalloys, solid solution superalloys and gamma prime hardened alloys. At present, nickel based, gamma prime hardened alloys include INCO 713C, Mar M-200, Rene 80, Rene 95, Rene 125, Rene 41, Udimet 500 and Udimet 520. These range from low (i.e. Rene 41) to medium (i.e., INCO 713C) to high (i.e. Rene 125) levels of gamma prime hardening. All levels may be cleaned and rendered brazable with the instant process. The invention will principally be described with reference to gamma prime hardened alloy parts with the understanding that the teachings of the invention are equally applicable to other metals. In that regard, the references to aluminum oxide below are not applicable to stainless steels or solid solution superalloys.

Simply stated, the objective of any pre-braze cleaning process is to eliminate passivating oxides from the metallic surface including the surfaces of any cracks or crevices such that the surface can be wet by the brazing alloy. The passivating oxides may be eliminated by actually removing them from the metal surface or by converting them to a non-passivating and, more particularly, elemental form. This is accomplished in the invention process by converting the oxides to their fluorides, allowing the volatile fluorides to sublime from the metal surface, and reducing the non-volatile fluorides to their conjugate metals. The invention process is described herein with respect to two types of oxides, one type is represented by $Al_2O_3$ and the other type by $Cr_2O_3$. Oxides which are more stable than $Cr_2O_3$, such as $Al_2O_3$ react with the invention atmosphere and generate volatile fluorides such as $AlF_3$; these oxides are removed by having the volatile fluorides sublime from the surface of the metal. The other oxides such as $Cr_2O_3$ generate crystalline and non-volatile fluorides in the invention atmosphere, and they are rendered non-passivating by reduction to their corresponding elemental form as the invention atmosphere is caused to become rich in hydrogen. The invention process can be described as occurring in three stages.

Stage I

In the first stage of the invention process, a cleaning atmosphere is established which converts the noble oxides on the surface and in the cracks of the metal to their fluorides. This may be accomplished by reacting a fluorocarbon source, such as PTFE, with hydrogen to produce a reducing atmosphere in which $Al_2O_3$ is converted to $AlF_3$ and $Cr_2O_3$ is converted to $CrF_3$. Similar reactions occur for the other metals present in the alloy (aluminum not being present in the case of stainless steel and many superalloys). This stage is conducted above 450° C. but below 800° C. The C/H ratio is adjusted such that carbon does not precipitate from the atmosphere, i.e., there is no sooting. The F/H ratio is set at a level at which the conversion of oxides to fluorides occurs in a timely manner. The F/H ratio used in Stage I depends on the metals present in the alloy to be cleaned. For example, the phase diagrams herein demonstrate that where aluminum (and related metals such as titanium) are present, higher F/H ratios are required in Stage I than when it is not. Furthermore, in the course of converting aluminum oxide to its fluoride, chromium oxide is also converted to its fluoride. This is because at a predetermined temperature, pressure and H/O ratio, the chromium conversion occurs at a lower F/H level.

Stage II

In the second stage of this invention process, the metal surface is depleted of Al and Ti. This is accomplished by maintaining the type of atmosphere established in Stage I for a time sufficient to convert the oxides passivating the surface to fluorides and to draw Al and Ti from the surface by diffusion. On the surface, the oxides of Al and Ti form volatile fluorides which are removed by sublimation. This depletes the surface layer of Al and Ti and prevents the oxides of these elements from reforming upon exposure to air.

Stage III

In the third stage of the invention process, the crystalline non-volatile fluorides formed in Stage I and Stage II are converted to their conjugate metals. This stage is entered when the atmosphere becomes predominantly hydrogen. Since of the non-volatile fluoride formers, oxides of chromium are the most difficult to destabilize, it will be apparent that in destabilizing these fluorides the invention process also eliminates any other such passivating oxides from the surface by converting them to their conjugate metallic elements. Stage III is generally accomplished at temperatures in the range of 750° C. to 1000° C., at an F/H ratio which will destabilize $CrF_3$.

The invention process is most clearly demonstrated graphically. Thus, the data which reveal the atmospheres that stabilize chromium are presented in FIGS. 1-4, using phase stability diagrams. In each figure, the pressure is fixed at 1.0 atm. and the H/O ratio is set at $10^5$. The phase fields are shown imposed on an abscissa which is the F/H ratio and the ordinate which is the C/H ratio. $Al_2O_3$ and $Cr_2O_3$ are representative of the passivating oxides found on the surface of gamma prime hardened nickel alloys and superalloys. For this reason a Cr-Al-C-O-H-F system is used to illustrate the invention.

FIGS. 1-4 demonstrate the invention system at 550° C., 750° C., 800° C. and 900° C., respectively. In each diagram, Curve A represents the sooting line, i.e., the point at which carbon can precipitate from the gas phase at the temperature, pressure and H/O ratio of the treating atmosphere. Sooting must be avoided during the actual cleaning process although a minor amount of sooting which does not interfere with the system operation may occur in reaching the cleaning condition. It will be noted that as the temperature increases, the sooting line occurs at lower C/H ratios.

Curve B in the figures is the equilibrium line for an $Al_2O_3$ (solid)-$AlF_3$ (gas) system under the system conditions prescribed above. Below and to the left of Curve B, a metal part may have $Al_2O_3$ and similar metal oxides on its surface. In this condition the part cannot be brazed. Above and to the right of Curve B, these oxides are converted to fluorides and removed from the metal surface.

Curves C and D on the phase stability diagrams bound the elemental chromium stability region from those of its oxide ($Cr_2O_3$) and fluoride ($CrF_3$). Above and to the right of Curve C, chromium is present as a crystalline fluoride on the surface of the metal, unless at points along Curve C the fluoride is unstable in favor of the element, chromium. Below and to the left of curve C chromium is present as $Cr_2O_3$. When there is a stable chromium region, a Curve D appears, and the area between Curves C and D represents the thermodynamic conditions under which the C-O-H-F atmospheres stabilize chromium in its elemental form, hereafter the elemental chromium region.

By working among FIGS. 1, 2, 3 and 4 by adjusting (increasing) the temperature, and managing C/H and F/H ratios, the requisite stages for cleaning are accomplished.

FIG. 1 displays the most accessible $AlF_3$ region. Comparison of FIG. 1 to FIGS. 2, 3 and 4 reveals that a broad range of compositions are available to accomplish the oxide to fluoride conversions at low temperatures whereas at higher temperatures the conversion cannot be accomplished for aluminum within the preferred C/F ration range. Thus, in accordance with the invention Stage I oxide to fluoride conversions are preferably accomplished at lower temperatures, for example, temperatures ranging from approximately 450° C. to below 800° C.

Figure 2:
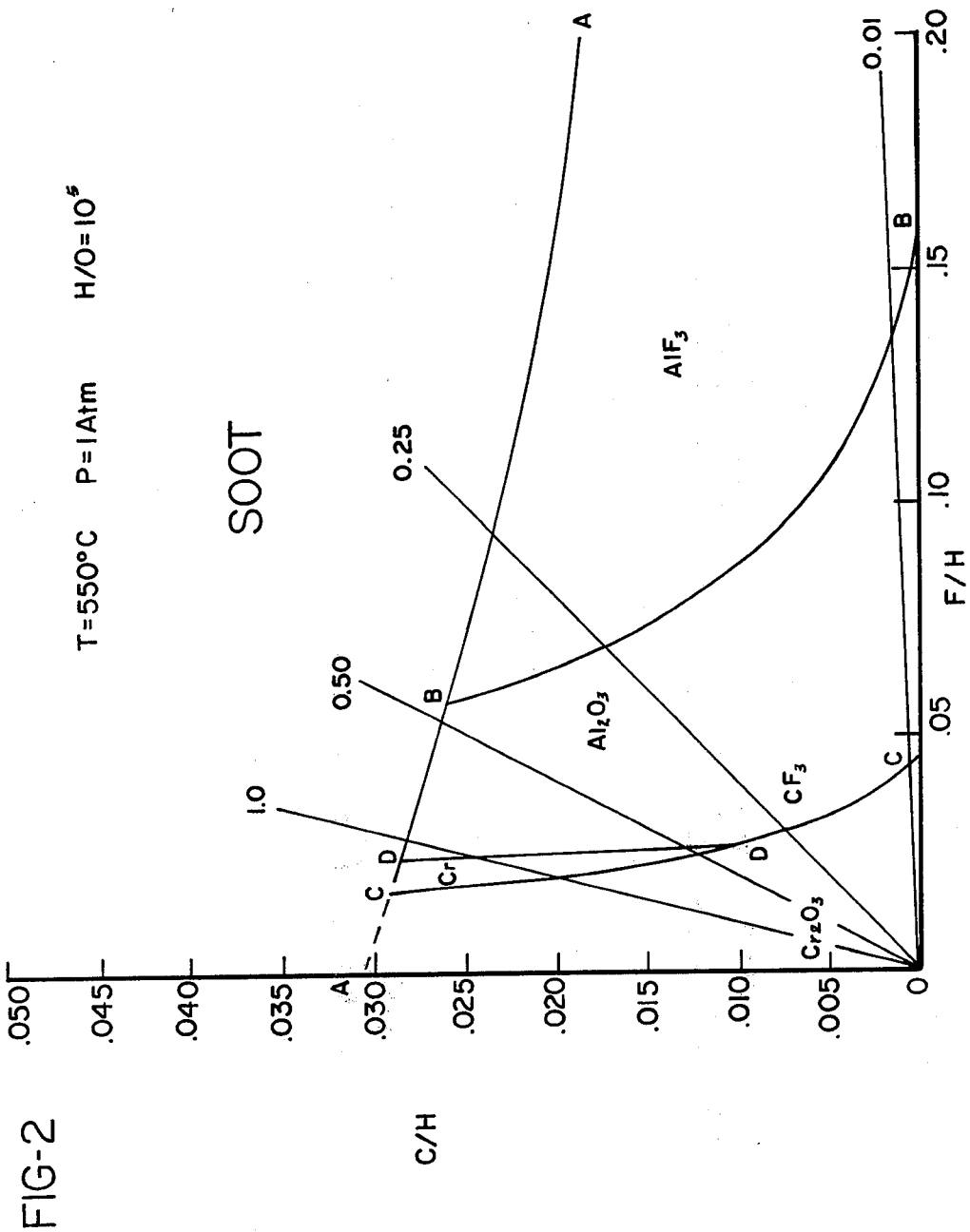
FIG. 2 is a phase stability diagram for the system of FIG. 1 where $T = 750°$ C.
Figure 3:
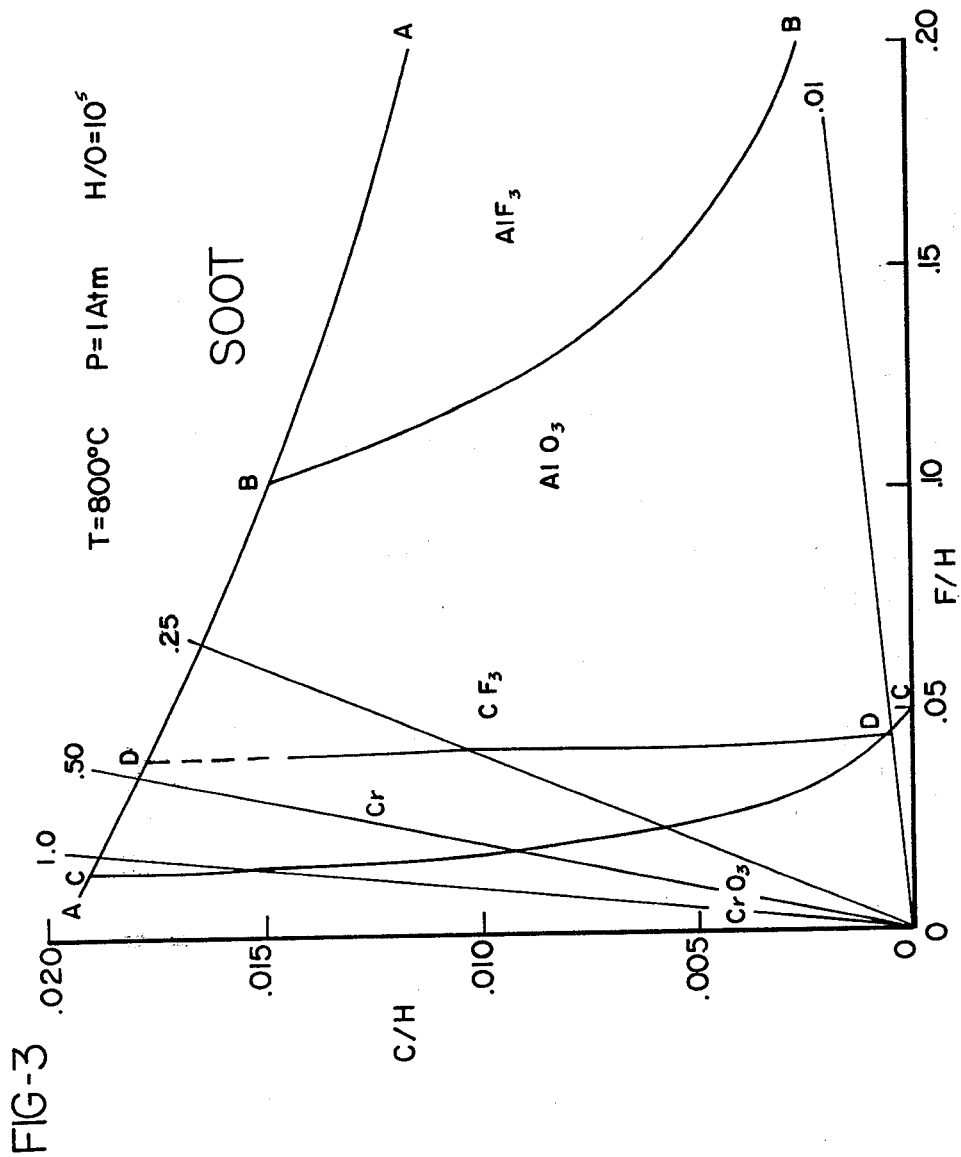
FIG. 3 is a phase stability diagram for the FIG. 1 system where $T = 800°$ C.
Figure 4:
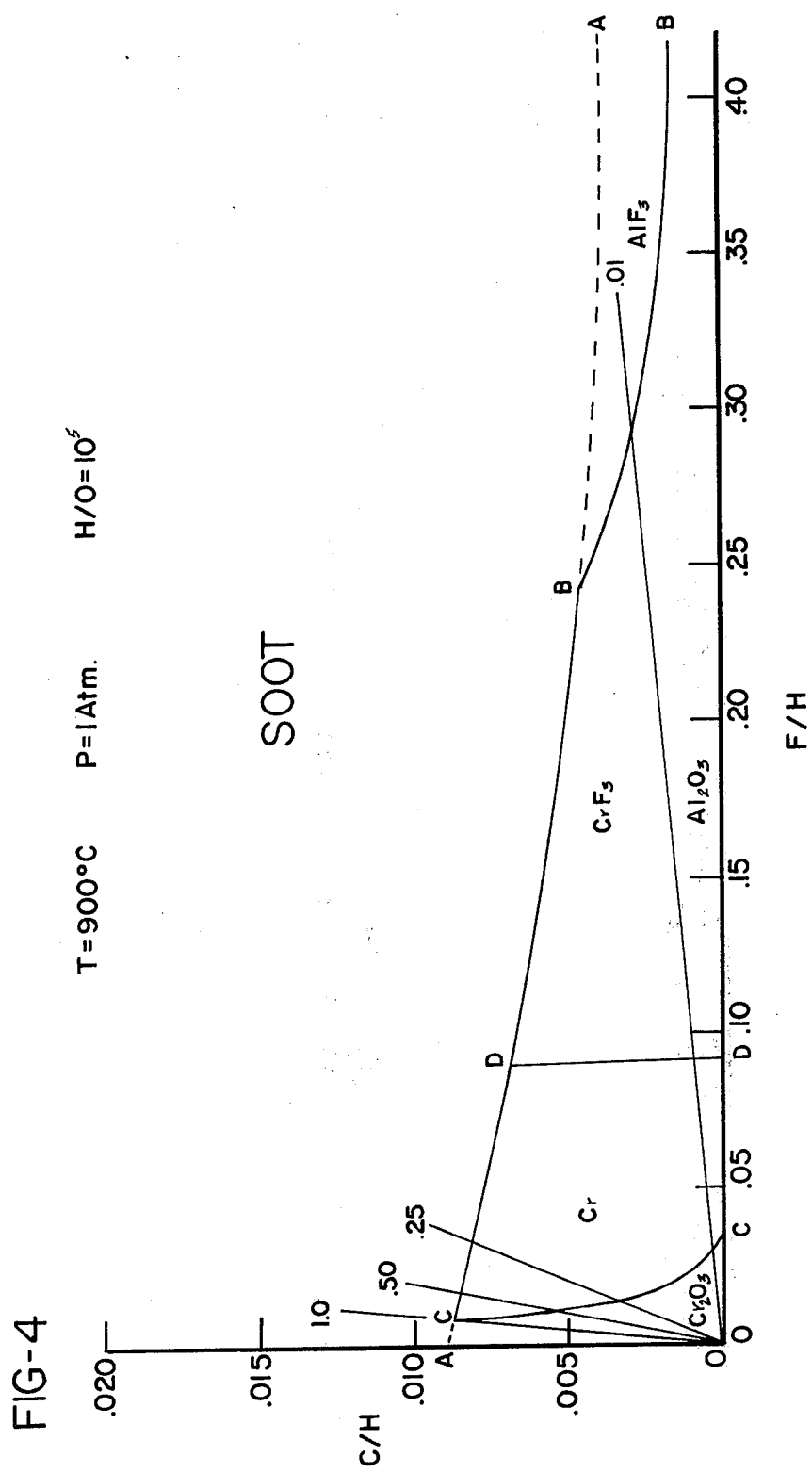
FIG. 4 is a phase stability diagram for the FIG. 1 system where $T = 900°$.

Comparison of FIGS. 2, 3 and 4 illustrates that the area of the elemental chromium region increases as the temperature at which the system operates increases, up to 1000° C. Hence, Stage III of the invention process occurs at temperatures of about 750° C. and higher and preferably at temperatures of about 800° C. to 900° C.

It will also be noted that the elemental chromium region lies almost wholly under Curve B. Those skilled in the art therefore, will understand that in one embodiment of the invention process, through temperature control and management of C/H and F/H ratios, the system moves to the right and then back to the left in the phase diagrams as the temperature is increased to accomplish cleaning. That is, cleaning is initiated in Stage I by converting the oxides to fluorides by establishing a thermodynamic condition or point above Curve B and below Curve A in the phase stability diagrams.

Subsequently, after the surface oxides have been converted to fluorides and Al and Ti have been extracted from the surface in Stage II, the system is moved to the elemental chromium region where the non-volatile crystalline fluorides, particularly chromium, are converted to their conjugate metal in Stage III. In terms of operating the cleaning retort, this means that the C-O-H-F atmosphere which generated the fluorides in Stages I and II is diluted with hydrogen to reduce the F/H ratio while the temperature is increased to bring the system to the elemental chromium region, i.e., a condition at which the chromium metal is stable. The cleaning is then complete and the system is cooled. At this point all surfaces to a depth of approximately 25 microns are essentially the parent alloy minus the Al and Ti but, corresponding slightly enriched with Cr. The surfaces are brazable by use of the standard nickel brazing techniques.

For stainless steels, only Stages I and III are applicable. Stainless steels do not contain the depletable metals, Al and Ti. In the case of stainless steels, Stage I above is therefore illustrated by the conversion of $Cr_2O_3$ to $CrF_3$ and the process is completed in Stage III wherein $CrF_3$ is converted to Cr.

FIGS. 1–4 are also labeled with C/F ratio lines wherein C/F is 1.0, 0.5, 0.25 and 0.01, respectively. It will be understood that the C/F ratio is determined solely by the source of carbon and fluorine for the atmosphere and that any number of sources of these elements may be utilized. Fluorocarbons are one such source.

There are various sources of the C-F constituent of the invention atmosphere. As disclosed in the inventor's U.S. Pat. No. 4,188,237, it is known that PTFE resin liberates active fluorine-containing species when heated to 350° C. or higher in the presence of hydrogen. There are, however, other sources of the C-O-H-F cleaning atmosphere. The invention atmosphere can, for example, be generated by reacting hydrogen with any saturated or unsaturated fluorocarbon including difluoromethane ($CH_2F_2$), tetrafluoromethane ($CF_4$), tetrafluoroethylene ($C_2F_4$) and many of the freons. In addition, the cleaning atmosphere may be generated from a mixture of HF, $CH_4$, and $H_2$.

Substantially any fluorocarbon that can be pyrolyzed may be used in the present invention. The most expedient source of the cleaning atmosphere is the fluorocarbon resin which releases fluorine containing species upon thermal decomposition. Other fluorocarbon resins which release gaseous fluorine species upon thermal decomposition may also be used. Decomposed fluorocarbon resin gases are a convenient source of the cleaning atmosphere because they are not only moisture-free, but also react with moisture otherwise introduced to create an extremely reducing atmosphere.

Where the C-O-H-F atmosphere is derived from PTFE, the C/F ratio in the retort is approximately 0.5, there being a 1:2 ratio of carbon to fluorine atoms in the resin. At the same time, atmospheres having C/F=0.5 can be derived from difluoroethylene and mixtures of tetrafluoromethane and hydrogen among others. A C/F ratio of 0.25 corresponds to sources where the ratio of carbon to fluorine atoms in the source is 1:4, such as tetrafluoromethylene. Similarly, the entire range of ratios can be attained using mixtures of HF, methane and hydrogen. Preferred C/F ratios are within the range of 0.5 to 0.2. Using a given unvarying C-F source, the system operates along a C/F ratio line corresponding to the carbon to fluorine atomic ratio of the source.

C/F atomic ratios ranging from approximately 0.01 to less than 2 can be used in the invention. A preferred C/F range is approximately 0.01 to 1.0. Thus, in FIG. 1 a C/F ratio of 1.0 is in the $AlF_3$ region and in FIG. 2 a line for the C/F ratio of 1.0 still intersects the Cr region and be operable within the other parameters listed. The low end of the range is illustrated in FIGS. 3–4 where a line on the C/F ratio of 0.01, or slightly less, will intersect the Cr region. At a C/F ratio of 2.0 it is difficult to reach the $AlF_3$ region at 550° C. (P=1.0 atm., $H/O=10^5$) and the Cr region at 750° C.

Theoretically any C/H ratio other than zero can be used in the present invention which does not cause sooting under the retort conditions. In FIG. 3, which represents one of the preferred systems, the elemental chromium region occurs for C/H greater than $5.0 \times 10^{-4}$ to C/H of approximately $1.9 \times 10^{-2}$. These points correspond to C/F ratios of 0.13 and 1.32 respectively.

Suitable F/H ratios depend on the nature of the oxides to be eliminated and are subject to the temperature at which the cleaning process is operated within the aforementioned range of 450° to 1000° C. The system is preferably operated at an F/H ratio at which the oxide to fluoride conversions occur in a timely manner. In general, F/H ratios less than 0.3 are suitable with ratios approximately 0.01 to 0.06 including the principal regions in which elemental chromium is stable.

One illustrative condition at which elemental chromium can be stabilized corresponds to the C/H, F/H and H/O ratios as follows:
C/H=0.004
F/H=0.04
$H/O=10^5$ This indicates a gas mixture having the following approximate composition:
$H_2$=94.5 v/o
HF=4.7 v/o
$CF_4$=0.8 v/o
$H_2O$=0.002 v/O A totally equivalent mixture that can be used and includes methane rather than tetrafluoromethane is:
$H_2$=91.3 v/o
HF=7.9 v/o
$CH_4$=0.8 v/o
$H_2O$=0.002 v/o These gas compositions are readily contrived by creating mixtures of HF, $CF_4$, $CH_4$ and $H_2$ (containing 20 ppm $H_2O$) in the appropriate proportions. This gas mixture will stabilize chromium in preference to its oxide or fluoride at temperatures between 800° C. and 1000° C. under conditions of thermodynamic equilibrium.

Theoretically, there is no minimum on the concentration of carbon, fluorine and hydrogen which must be present in the cleaning atmosphere to render the metal parts brazable or otherwise bondable as long as the amounts of carbon, fluorine and hydrogen present satisfy the aforementioned ratios and, particularly, the H/O ratio. The composition of the atmosphere will ultimately be dictated by the thermodynamic equilibrium established in the retort. Where certain minimum amounts of these elements are not present, the process may take an inconvenient amount of time. Point P on FIG. 1 signifies a gas composition that is potentially achieveable by the preferred embodiment of PTFE and $H_2$ and represents that atmosphere which is consonant with the cleaning process and reasonable speed. It is also the most concentrated in carbon and fluorine which at the same time avoids major sooting. This point is C/H=0.15 and F/H=0.30 and corresponds to the following atomics percent:
% C=10.34,
% F=20.68 and
% H=68.97.

The C and F levels represented by this atmospheric composition are about as high as the practitioner need go to successfully clean metal parts to render them brazable. Thus, typically the invention process is performed at an F/H ratio less than or equal to 3.0 and a C/H ratio less than or equal to 0.15. The invention process can, however, be operated at higher levels. In practicing the invention it will be appreciated that these levels are attained in Stage I and subsequently diluted to destabilize the chromium fluorides.

It has been found that the key to cleaning metals at low temperatures (under 1000° C.) using the invention process is control of the H/O ratio. At H/O ratios of around $10^4$, the metal parts can be adequately cleaned at temperatures as low as approximately 800°–850° C. At a ratio of around $10^5$, the metal parts can be adequately cleaned at temperatures as low as approximately 700°–750° C. At even greater H/O ratios, to the extent they are obtainable, even lower cleaning temperatures are possible, however, much higher H/O ratios are difficult to obtain. This is illustrated in FIG. 5, which is a phase stability diagram for the chromium system at 800° C. for an H/O ratio of $10^4$. In contrast to FIG. 3 in which the H/O ratio is $10^5$, in FIG. 5 there is no elemental chromium region. Curves A-C are present in FIG. 5 as in the other figures, however, there is no Curve D representing the transition to the elemental chromium. At an H/O ratio of $10^4$, the elemental chromium region can be attained, but it does not appreciably rise until temperatures of about 850° C. are reached and at that temperature the Cr region is relatively small making the condition difficult to maintain.

The H/O ratios of $10^4$ and $10^5$ correspond to approximately 200 and 20 ppm $H_2$, respectively, present as moisture in the hydrogen gas used as a component of the C-O-H-F atmosphere. It is difficult to obtain hydrogen or hydrogen fluoride gases which have fewer parts per million $H_2O$ present. To the extent that drier hydrogens can be or ever are obtained, higher H/O ratios could be achieved and they would be that much more advantageous. The addition of other oxidizing gases or, for that matter, any substantial amount of non-inert gases other than those relied upon for the C-O-H-F content of the atmosphere is to be avoided.

The thermodynamics underlying the present invention are substantially independent of pressure. Hence, there is little or no advantage to operating the production furnace at pressures above or below atmospheric, although such pressures are certainly operable.

Having described the invention in detail and by reference to specific embodiments thereof, it will be apparent that numerous variations and modifications are possible without departing from the scope of the invention defined by the following claims.

What is claimed is:

1. A method for cleaning unbrazable metal parts to render them brazable or otherwise bondable which comprises:
   (a) placing said part in a hermetically sealed chamber,
   (b) subjecting said part to a gaseous atmosphere, said atmosphere containing the elements C, O, H and F and having an H/O ratio of $10^4$ or greater and a C/F ratio of about 0.01 to less than 2.0,
   (c) raising the temperature of said chamber to a temperature less than 800° C. and establishing a F/H ratio in said atmosphere at which passivating oxides on the surface of said part are converted to fluorides,
   (d) raising the temperature of said chamber above the temperature employed in step (c) to a temperature less than 1000° C. and diluting said atmosphere with additional hydrogen to destabilize $CrF_3$ on the surface to elemental chromium,
   (e) cooling said chamber and said part.

2. The method of claim 1 wherein said C/F ratio is approximately 0.01 to 1.0.

3. The method of claim 2 wherein said C-O-H-F atmosphere is produced by thermal decomposition of a fluorocarbon resin.

4. The method of claim 2 wherein said C-O-H-F atmosphere is derived from a mixture of HF, methane and hydrogen.

5. The method of claim 2 wherein said C-O-H-F atmosphere is derived from a saturated or unsaturated fluorocarbon.

6. The method of claim 2 wherein said C-O-H-F atmosphere is derived from a freon.

7. The method of claim 2 wherein said atmosphere is maintained at C/H ratios which do not cause sooting at said temperature.

8. The method of claim 7 wherein said C/H ratio is less than or equal to 0.15 and greater than 0.

9. The method of claim 2 wherein the C/F ratio of said atmosphere is in the range of approximately 0.5 to 0.2.

10. The method of claim 9 wherein said C/F ratio is 0.25.

11. The method of claim 9 wherein said C/F ratio is 0.5.

12. The method of claim 2 wherein said temperature of step (c) is greater than 450° C.

13. The method of claim 2 wherein said temperature of step (d) is greater than 750° C.

14. The method of claim 13 wherein said F/H ratio of step (c) is less than or equal to 0.30.

15. The method of claim 2 wherein following step (e) said part is subsequently subjected to brazing.

16. The method of claim 2 wherein following step (e) said part is subsequently subjected to metallic bonding.

* * * * *